(12) United States Patent
Shin et al.

(10) Patent No.: US 9,002,279 B2
(45) Date of Patent: Apr. 7, 2015

(54) SYSTEM AND METHOD FOR ALIGNING INTERFERENCE IN UPLINK

(75) Inventors: Won Jae Shin, Yongin-si (KR); Nam Yoon Lee, Seoul (KR); Chang Yong Shin, Seoul (KR); Kyung Hun Jang, Suwon-si (KR); Won Jong Noh, Yongin-si (KR); Hyun Ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 647 days.

(21) Appl. No.: 13/166,342

(22) Filed: Jun. 22, 2011

(65) Prior Publication Data
US 2012/0040706 A1 Feb. 16, 2012

(30) Foreign Application Priority Data
Aug. 10, 2010 (KR) .................. 10-2010-0076981

(51) Int. Cl.
*H04B 15/00* (2006.01)
*H04B 17/00* (2006.01)
(Continued)

(52) U.S. Cl.
CPC .............. *H04W 28/04* (2013.01); *H04W 24/00* (2013.01); *H04W 48/08* (2013.01); *H04W 84/045* (2013.01)

(58) Field of Classification Search
CPC . H04W 36/08; H04W 84/12; H04W 36/0016; H04W 52/0245; H04W 52/241; H04W 12/06; H04W 12/12; H04W 16/10; H04W 16/14; H04W 16/18; H04W 16/32; H04W 24/00; H04W 24/08; H04W 28/00; H04W 28/04; H04W 28/18; H04W 36/04; H04W 36/18; H04W 36/30; H04W 72/04; H04W 72/0446; H04W 72/082; H04W 52/0206; H04W 52/242; H04W 52/248; H04W 52/325; H04W 52/42; H04W 72/1247; H04B 7/18541; H04B 17/0077; H04B 7/024; H04B 7/0669; H04B 1/525; H04B 7/026; H04B 7/0617; H04B 7/0632; H04B 7/0663; H04B 7/0684; H04B 7/0691; H04L 5/0007; H04L 12/2697; H04L 27/2647; H04L 27/2657; H04L 43/50; H04L 47/10; H04L 63/08; H04L 5/0037; H04L 5/0064; H04L 67/1095; H04L 67/2819; H04L 67/2833; H04L 67/2861
USPC ......... 370/209, 235, 252, 255, 280, 310, 311, 370/328, 329, 330, 331, 332, 345; 375/285, 375/346; 455/20, 63.1, 67.11, 67.13, 411, 455/423, 431, 434, 435.1, 435.2, 436, 444, 455/446, 450, 452.1, 452.2, 456.1, 500, 455/517, 550.1, 522, 561
See application file for complete search history.

(56) References Cited

U.S. PATENT DOCUMENTS

| 2008/0075058 A1* | 3/2008 | Mundarath et al. ........... 370/342 |
| 2008/0107085 A1* | 5/2008 | Yoon ............................. 370/333 |

(Continued)

FOREIGN PATENT DOCUMENTS

| KR | 10-2006-0077800 | 7/2006 |
| KR | 10-2009-0062617 | 6/2009 |

(Continued)

*Primary Examiner* — Yuwen Pan
*Assistant Examiner* — Paul P Tran
(74) *Attorney, Agent, or Firm* — NSIP Law

(57) ABSTRACT

Provided is a method of generating a transmit beamforming vector and a receive beamforming vector to substantially eliminate the effect of interference transmitted from macro terminals to a pico base station in a hierarchical cell environment. Also, provided is a method of selecting, from a plurality of macro terminals, a macro terminal for transmitting data to a macro base station.

21 Claims, 9 Drawing Sheets

(51) Int. Cl.

| | |
|---|---|
| H04W 72/00 | (2009.01) |
| H04B 7/00 | (2006.01) |
| H01Q 3/00 | (2006.01) |
| G01S 5/02 | (2010.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 4/00 | (2009.01) |
| H04K 1/10 | (2006.01) |
| H04L 27/28 | (2006.01) |
| H04B 7/02 | (2006.01) |
| H04L 1/02 | (2006.01) |
| H04W 28/04 | (2009.01) |
| H04W 24/00 | (2009.01) |
| H04W 48/08 | (2009.01) |
| H04W 84/04 | (2009.01) |

(56) References Cited

U.S. PATENT DOCUMENTS

| | | | |
|---|---|---|---|
| 2008/0146154 A1* | 6/2008 | Claussen et al. | 455/63.1 |
| 2008/0309554 A1* | 12/2008 | Venkatesan | 342/367 |
| 2009/0131065 A1* | 5/2009 | Khandekar et al. | 455/452.1 |
| 2009/0154352 A1* | 6/2009 | Sun | 370/235 |
| 2009/0286562 A1* | 11/2009 | Gorokhov | 455/501 |
| 2010/0035647 A1* | 2/2010 | Gholmieh et al. | 455/522 |
| 2010/0124930 A1* | 5/2010 | Andrews et al. | 455/436 |
| 2010/0150013 A1* | 6/2010 | Hara et al. | 370/252 |
| 2010/0309854 A1* | 12/2010 | Wu et al. | 370/329 |
| 2010/0323711 A1* | 12/2010 | Damnjanovic et al. | 455/450 |
| 2011/0059765 A1* | 3/2011 | Kim et al. | 455/550.1 |
| 2011/0098055 A1* | 4/2011 | Kwon et al. | 455/452.2 |
| 2011/0103347 A1* | 5/2011 | Dimou | 370/331 |
| 2011/0207415 A1* | 8/2011 | Luo et al. | 455/68 |
| 2011/0222615 A1* | 9/2011 | Kuo et al. | 375/260 |

FOREIGN PATENT DOCUMENTS

| | | |
|---|---|---|
| KR | 10-2009-0105534 | 10/2009 |
| WO | WO 2008/139896 | 11/2008 |

* cited by examiner

SYSTEM AND METHOD FOR ALIGNING INTERFERENCE IN UPLINK

CROSS-REFERENCE TO RELATED APPLICATION(S)

This application claims the benefit under 35 U.S.C. §119 (a) of Korean Patent Application No. 10-2010-0076981, filed on Aug. 10, 2010, in the Korean Intellectual Property Office, the entire disclosure of which is incorporated herein by reference for all purposes.

BACKGROUND

1. Field

The following description relates to a method of determining a transmit beamforming vector and a receive beamforming vector to substantially eliminate the effect of interference transmitted from macro terminals to a pico base station in a hierarchical cell environment.

2. Description of Related Art

To secure sufficient frequency resources, it has been suggested that a next generation mobile communication system may use a high frequency compared to a carrier frequency used in a current mobile communication system. Accordingly, the use of a higher frequency may result in a path loss increase and a cell coverage decrease.

Research has been conducted to decrease an inter-cell distance in preparation for the decrease in the cell coverage of next generation mobile communication systems. However, one consequence of this research has been an increase in the effect of interference from a plurality of adjacent cells to a user positioned at a cell edge. Accordingly, a data transmission rate of a user positioned at a cell edge may decrease, which may present difficulties in guaranteeing a quality of service (QoS).

SUMMARY

In one general aspect, a method of transmitting and receiving at a macro terminal includes receiving, by a receiver of the macro terminal, information associated with a transmit beamforming vector from a pico base station, wherein the pico base station receives a transmit beamformed first data stream from a pico terminal, transmit beamforming of a second data stream according to the transmit beamforming vector, and transmitting, by a transmitter of the macro terminal, the transmit beamformed second data to a macro base station, wherein the transmit beamforming vector is calculated based on a channel matrix of a channel formed between the pico terminal and the pico base station.

The method may further include transmit beamforming of a third data steam by a second macro terminal, and transmitting, by the second macro terminal, the transmit beamformed third data stream to the macro base station, wherein the third data stream and the second data stream are received by the pico base station with substantially the same phase.

A received phase of the first data stream may be substantially orthogonal to a received phase of the second data stream.

The second macro terminal may generate a transmit beamforming vector that substantially minimizes a phase difference between the third data stream and the second data stream.

In another general aspect, a pico base station includes a channel matrix generator to generate a first channel matrix by estimating a channel formed between the pico base station and a pico terminal, a beamforming vector generator to generate a transmit beamforming vector of the pico terminal and a transmit beamforming vector of a macro terminal based on the first channel matrix, a transmitter to transmit, to the pico terminal, the transmit beamforming vector of the pico terminal, and to transmit, to the macro terminal, the transmit beamforming vector of the macro terminal, and a receiver to receive, from the pico terminal, a first data stream that is transmit beamformed according to the transmit beamforming vector of the pico terminal, and to receive, from the macro terminal, a second data stream that is transmit beamformed according to the transmit beamforming vector of the macro terminal.

In the pico base station, the beamforming vector generator may be configured to generate a transmit beamforming vector of a second macro terminal, the transmitter may be configured to transmit, to the second macro terminal, the transmit beamforming vector of the second macro terminal, and the receiver may be configured receive, a third data that is transmit beamformed according to the transmit beamforming vector of the second macro terminal, wherein the third data stream is transmitted with substantially the same phase as the second data stream.

In the pico base station, the beamforming vector generator may be configured to generate a receive beamforming vector based on the first channel matrix, and the receiver may be configured to apply receiving beamforming of to the first data stream according to the receive beamforming vector.

The beamforming vector generator may be configured to generate the transmit beamforming vector of the macro terminal such that the first data stream received by the receiver is substantially orthogonal to the second data stream received by the pico base station.

The pico base station may include a singular value decomposition (SVD) performing unit to perform SVD of the channel matrix.

The channel matrix generator may be configured to generate a second channel matrix by estimating a channel between the pico base station and the macro terminal, and the beamforming vector generator may be configured to calculate the transmit beamforming vector of the macro terminal according to one of Equation 1 or Equation 2:

$$v = \mu \cdot \begin{bmatrix} -(\tilde{h}^{(2)})^H \\ (\tilde{h}^{(1)})^H \end{bmatrix} \quad \text{[Equation 1]}$$

$$v = \mu \cdot \begin{bmatrix} (\tilde{h}^{(2)})^H \\ -(\tilde{h}^{(1)})^H \end{bmatrix}, \quad \text{[Equation 2]}$$

wherein v corresponds to the transmit beamforming vector of the macro terminal, μ corresponds to a predetermined constant, and $\tilde{h}^{(1)}$ and $\tilde{h}^{(2)}$ are determined according to Equation 3:

$$\tilde{h} = \alpha \cdot u^H \cdot H = \begin{bmatrix} \tilde{h}^{(1)} \\ \tilde{h}^{(2)} \end{bmatrix}, \quad \text{[Equation 3]}$$

wherein $u_1$ corresponds to a receive beamforming vector of the pico base station, H corresponds to the second channel matrix, and a corresponds to a predetermined constant.

The second macro terminal may be configured to apply beamforming to the third data stream and to transmit the beamformed third data stream to the macro base station; and the beamforming vector generator may be configured to generate the transmit beamforming vector by calculating a vector that minimizes a phase difference between the second data stream received by the receiver and the third data stream received by the receiver.

The channel matrix generator may be configured to generate a second channel matrix by estimating a channel between the pico base station and the macro terminal, and the beamforming vector generator may be configured to generate an autocorrelation matrix according to Equation 4, and to calculate an eigenvector corresponding to a minimum eigenvalue of the autocorrelation matrix as the transmit beamforming vector of the macro terminal:

$$R = H^H \cdot H \qquad \text{[Equation 4]}$$

where R corresponds to the autocorrelation matrix, and H corresponds to the second channel matrix.

In still another general aspect, a macro base station includes a signal quality information generator to generate signal quality information associated with each channel formed between the macro base station and each of a plurality of macro terminals, a terminal grouping unit to determine a plurality of terminal groups from the plurality of macro terminals, based on the signal quality information, a data rate predictor to predict a data rate with respect to each of the terminal groups by scheduling each of the terminals groups, and a terminal selector to select, from the plurality of terminal groups, a terminal group for receiving data from the macro base station, wherein the terminal selector selects the terminal group based on the predicted data rate.

The signal quality information may include a signal to noise ratio (SNR) or a signal to interference and noise ratio (SINR).

The macro base station may further include a threshold value setting unit to set a signal quality threshold value, the signal quality threshold value including a value greater than a predetermined reference value when a number of the macro terminals is less than a predetermined threshold value. The terminal grouping unit may determine the plurality of terminal groups according to the macro terminals that have a signal quality information value greater than the signal quality threshold value.

The macro base station may further include a threshold value setting unit to set a signal quality threshold value, the signal quality threshold value comprising a value less than a predetermined reference value when a number of the macro terminals is greater than or equal to a predetermined threshold value. The terminal grouping unit may determine the plurality of terminal groups according to the macro terminals that have a signal quality information value greater than the signal quality threshold value.

According to certain examples herein, inter-cell interference transmitted from terminals included in a macro cell to a pico cell may be aligned in a hierarchical cell environment.

Further according to certain examples herein, a communication quality may be enhanced by decreasing inter-cell interference in a hierarchical cell.

Other features and aspects will be apparent from the following detailed description, the drawings, and the claims.

Figure 1A:
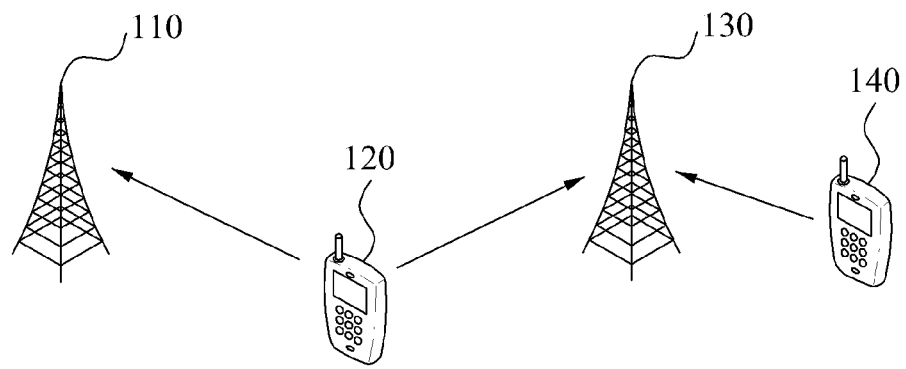
FIGS. 1A and 1B are diagrams illustrating an example of inter-cell interference in a hierarchical cell.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1B:
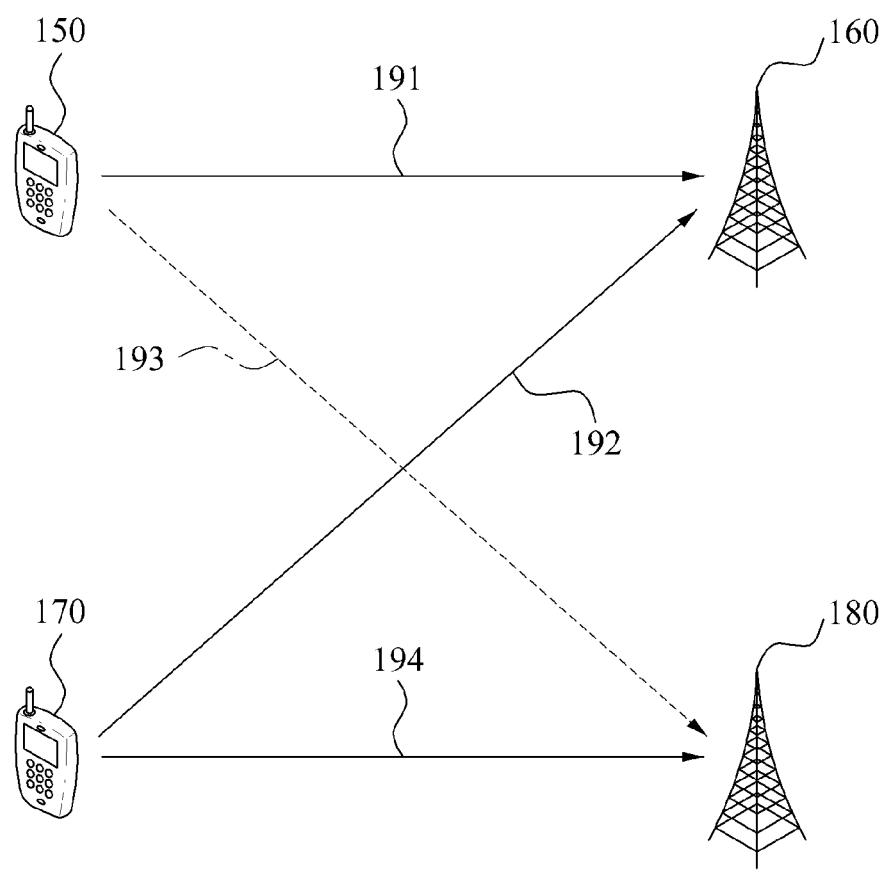

FIGS. 1A and 1B illustrate an example of inter-cell interference in a hierarchical cell.

FIG. 1A illustrates a signal received at each of a pico base station 130 and a macro base station 110 in a hierarchical cell.

The pico base station 130 is a base station associated with the macro base station 110. The pico base station 130 may be assigned with a portion of radio resources, for example, a frequency domain and a time domain allocated to the macro base station 110, and may use the assigned radio resource for data transmission. Accordingly, the radio resource used by the pico base station 130 may be the same as the radio resource used by the macro base station 110, or may be a subset of the radio resource used by the macro base station 110.

A macro terminal 120 may transmit first data to the macro base station 110. In general, a coverage area of the macro base station 110 is wider than a coverage area of the pico base station 130. Accordingly, the macro terminal 120 may transmit the first data using a relatively large transmission power as compared to a transmission power of the pico terminal 140. The first data transmitted from the macro terminal 120 may be transmitted to the pico base station 130. In this case, the first data may act as an interference signal to the pico base station 130.

A pico terminal 140 may transmit second data to the pico base station 130. In general, the coverage area of the pico base station 130 is narrower than the coverage area of the macro base station 110. Accordingly, the pico terminal 140 may transmit the second data using a relatively small transmission power as compared to a transmission power of the macro terminal 120. The second data transmitted from the pico terminal 140 may be transmitted to only the pico base station 130 positioned to be close from the pico terminal 140; that is, the data may not be received by the macro base station 110, for example, due to the macro base station being positioned away from the pico terminal 140. Referring to FIG. 1A, it can be assumed that an interference signal transmitted from the pico terminal 140 to the macro base station 110 does exist, but that a strength of the interference signal is comparatively small.

FIG. 1B illustrates an example of modeling a channel environment of FIG. 1A.

Second data transmitted from a pico terminal 150 may be transmitted to a pico base station 160 using a channel 191 formed between the pico terminal 150 and the pico base station 160. The second data transmitted from the pico terminal 150 may not be received by a macro base station 180. For example, it can be assumed that a strength of a channel 193 formed between the pico terminal 150 and the macro base station 180 is comparatively small.

First data transmitted from a macro terminal 170 may be transmitted to the pico base station 160 using a channel 192 formed between the macro terminal 170 and the pico base station 160. In this case, the first data may act as an interference signal in the pico base station 160. The first data transmitted from the macro terminal 170 may be transmitted to the macro base station 180 using a channel 194 formed between the macro terminal 170 and the macro terminal 180.

In FIG. 1B, it can be assumed that an interference signal transmitted from the pico terminal 150 to the macro base station 180 does not exist, or that a strength of the interference signal is comparatively small. Accordingly, in this example, the channel 193 formed between the pico terminal 150 and the macro base station 180 may be ignored. When considering only channels 191, 192, and 194 in FIG. 1B, the channels 191, 192, and 194 may form a shape similar to the letter "Z". Accordingly, the channel environment illustrated in FIG. 1B may be referred to as a Z channel model.

Figure 2:
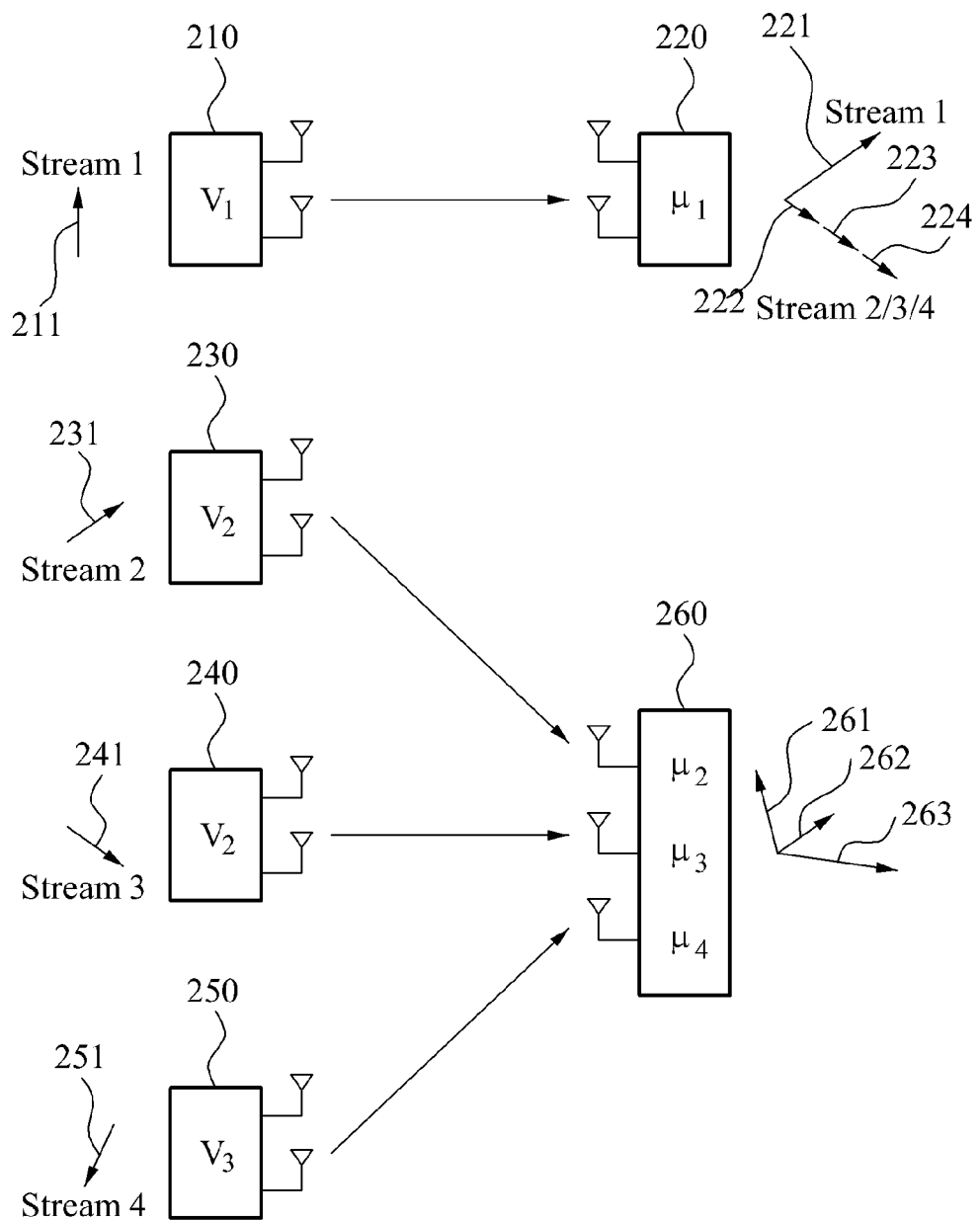
FIG. 2 is a diagram illustrating an example of cancelling interference transmitted to a pico base station.

FIG. 2 illustrates an example of cancelling interference transmitted to a pico base station.

Referring to the Z channel model of FIG. 1B, it can be assumed that an interference signal transmitted from a pico terminal 210 to a macro base station 260 does not exist, or has a comparatively small strength. Accordingly, if it is possible to control the effect of interference signals transmitted from macro terminals 230, 240, and 250 to a pico base station 220, a data receive performance between the pico base station 220 and the macro base station 260 may be enhanced.

In the example illustrated in FIG. 2, the pico base station 220 includes two receive antennas, the macro base station 260 includes three receive antennas, and each of the pico terminal 210 and the macro terminals 230, 240, and 250 includes two transmit antennas. In addition, for this example it can be assumed that the macro base station 260 and the pico base station 220 receive data using the same radio resource.

In FIG. 2, a number of data streams (degree of freedom (DOF)) that can be transmitted by the entire system may be increased by aligning a receive phase of an interference signal transmitted from each of the macro terminals 230, 240, and 250 to the pico base station 220.

Each of the macro terminals 230, 240, and 250 may transmit a data stream using a plurality of transmit antennas by controlling a phase of the data stream. Each of the macro terminals 230, 240, and 250 may control a phase of each of corresponding data streams 231, 241, and 251 transmitted by the macro terminals 230, 240, and 250 so that the data streams 231, 241, and 251 are aligned and thereby received at the pico base station 220 using the same phase 222, 223, and 224.

A data stream transmitted from each terminal may be expressed by Equation 1:

$$x_i = \sqrt{p_i} v_i s_i.$$ [Equation 1]

In Equation 1, i corresponds to a terminal index. Thus, $i=1$ with respect to the pico terminal 210 and $i=2, 3, 4$ with respect to the macro terminals 230, 240, and 250. $s_i$ corresponds to a data stream to be transmitted. $v_i$ corresponds to a transmit beamforming vector used for controlling a phase of a data stream by each of the pico terminal 210 and the macro terminals 230, 240, and 250. $p_i$ corresponds to a transmission power of the data stream.

In this example, a received signal $y_{pico}$ received by the pico base station 220 may be expressed by Equation 2, and a received signal $y_{macro}$ received by the macro base station 260 may be expressed by Equation 3:

$$y_{pico} = H_{11} \sqrt{p_1} v_1 s_1 + \underbrace{\sum_{i=2}^{M_2+1} H_{1i} \sqrt{p_i} v_i s_i}_{\text{other-cell interference}} + n_1$$ [Equation 2]

$$y_{macro} = \sum_{i=2}^{M_2+1} H_{2i} \sqrt{p_i} v_i s_i + n_2.$$ [Equation 3]

In Equation 2 and Equation 3, $H_{j,i}$ corresponds to a channel matrix of a radio channel formed between a terminal i and a base station j. In FIG. 2, the pico base station 220 may correspond to a base station 1 and the macro base station 260 may correspond to a base station 2. In addition, $n_j$ corresponds to a thermal noise component added to the base station j.

The data stream 211 transmitted from the pico terminal 210 may be received using a phase different from phases of the data streams 222, 223, and 224 transmitted from the macro terminals 230, 240, and 250. The pico base station 220 may cancel an interference signal aligned and received using the same phase by employing a plurality of receive antennas and a receive beamforming vector.

According to one example, a data transmission system of FIG. 2 may determine a substantially optimal transmit beamforming vector and a substantially optimal receive beamforming vector by performing singular value decomposition (SVD) with respect to a channel matrix $H_{11}$ of a channel formed between the pico terminal 210 and the pico base station 220 as expressed by Equation 4:

$$H_{11} = U^H DV = [u_1 \; u_2]^H \begin{bmatrix} \lambda_1 & 0 \\ 0 & \lambda_2 \end{bmatrix} [v_1 \; v_2],$$ [Equation 4]

where $\lambda_1 \geq \lambda_2$.

The pico terminal 210 may perform transmit beamforming using vector $V_1$, and the pico base station 220 may perform receive beamforming using vector $U_1$. Accordingly, it may be possible to achieve a substantially optimal data transmission efficiency.

In this example, each of the macro terminals 230, 240, and 250 may control a phase of each of data streams transmitted by each of the macro terminals 230, 240, and 250 so that the data streams may be aligned into a direction substantially orthogonal to $U_1$.

If a data stream is substantially orthogonal to $U_1$, the pico base station 220 can cancel an interference signal from each of the macro terminals 230, 240, and 250. When a vector orthogonal to $U_1$ is $U_2$, $U_2$ may be expressed by Equation 5:

$$\underset{\text{Orthogonal direction to the received BF vector}}{\mathrm{span}(u_2)} = \mathrm{span}[\, H_{12}v_2 \quad H_{13}v_3 \quad H_{14}v_4 \,]. \quad \text{[Equation 5]}$$

In Equation 5, $V_i$ corresponds to a transmit beamforming vector used by a macro terminal i.

Equation 5 may be arranged to Equation 6:

$$u_2 = \alpha_1 H_{12}v_2 = \alpha_2 H_{13}v_3 = \alpha_3 H_{14}v_4. \quad \text{[Equation 6]}$$

If $U_1^H$ is multiplied by Equation 6, it may be expressed as Equation 7:

$$\underset{\text{definition of orthogonal}}{0 = u_1^H u_2} = \quad \text{[Equation 7]}$$

$$\alpha_1 u_1^H H_{12} v_2 = \alpha_2 u_1^H H_{13} v_3 = \alpha_3 u_1^H H_{14} v_4$$

$$\Leftrightarrow \tilde{h}_{12}v_2 = \tilde{h}_{13}v_3 = \tilde{h}_{14}v_4 = 0.$$

In Equation 7, $\tilde{h}_{1i} = \alpha_{i-1} u_1^H H_{1i}$, and $v_i$ is present in a null space of $\tilde{h}_{1i}$. To satisfy this criterion, $v_i$ may be expressed by Equation 8:

$$v_k = \mu \cdot \begin{bmatrix} -(\tilde{h}_{1i}^{(2)})^H \\ (\tilde{h}_{1i}^{(1)})^H \end{bmatrix} \text{ or } v_k = \mu \cdot \begin{bmatrix} (\tilde{h}_{1i}^{(2)})^H \\ -(\tilde{h}_{1i}^{(1)})^H \end{bmatrix} \quad \text{[Equation 8]}$$

In Equation 8, k=2, 3, 4, $$\tilde{h}_{1i} = \begin{bmatrix} \tilde{h}_{1i}^{(1)} \\ \tilde{h}_{1i}^{(2)} \end{bmatrix},$$

and μ corresponds to a constant for maintaining a magnitude of $v_k$.

If each of the macro terminals 230, 240, and 250 perform transmit beamforming of a data stream using $v_k$ of Equation 8, the data stream may be substantially orthogonal to the data stream 221 transmitted from the pico terminal 210 to the pico base station 220. The pico base station 210 may cancel an interference signal using a variety of receiving schemes, for example, a zero-forcing (ZF) scheme, a minimum mean square error (MMSE) scheme, and the like, and may receive a data stream from the pico terminal 210.

When a data stream is transmitted according to the aforementioned scheme, each terminal, for example, each of the pico terminal 210 and the macro terminals 230, 240, and 250 may transmit the corresponding data stream without causing inter-cell interference.

When a transmit beamforming vector and a receive beamforming vector are generated according to the scheme described above with reference to FIG. 2, DOF may also linearly increase according to an increase in a number of receive antennas of the macro base station 260, as expressed by Equation 9:

$$\mathrm{DOF} = M_1 + M_2 - 1. \quad \text{[Equation 9]}$$

In Equation 9, $M_1$ corresponds to a number of receive antennas installed in the pico base station 220, and $M_2$ corresponds to a number of receive antennas installed in the macro base station 260.

When an additional macro terminal uses the transmit beamforming vector determined according to Equation 8, a data stream transmitted from the additional macro terminal may also use the same phase as the data streams 231, 241, and 251 transmitted from the macro terminals 230, 240, and 250. Accordingly, the pico base station 220 may cancel an interference signal from a macro terminal regardless of a number of macro terminals.

Figure 3:
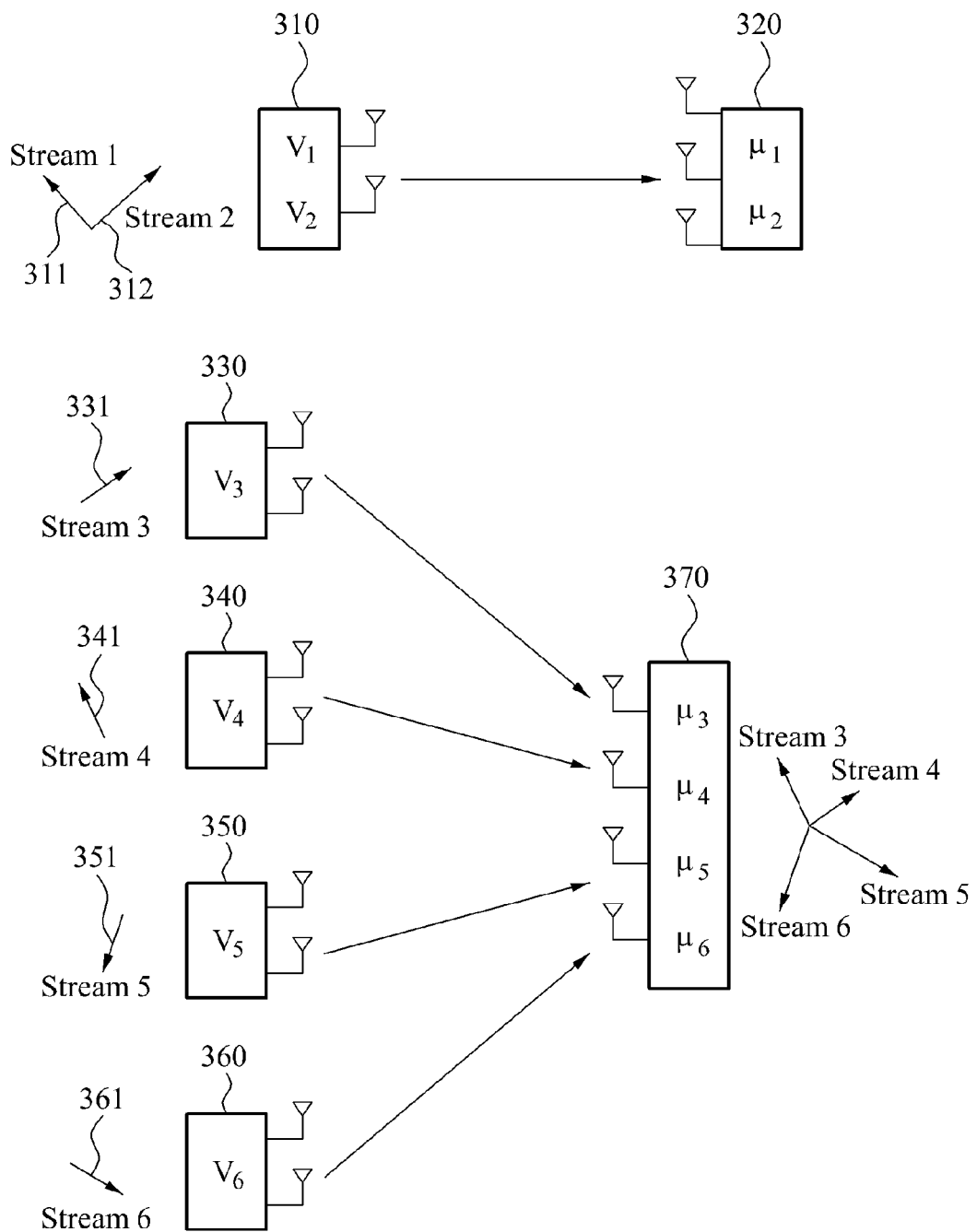
FIG. 3 is a diagram illustrating an example of decreasing interference transmitted to a pico base station.

FIG. 3 illustrates an example of decreasing interference transmitted to a pico base station. Accordingly, FIG. 3 illustrates an example where a pico base station 320 includes at least three receive antennas, and a macro base station 370 includes four receive antennas.

As described above with reference to FIG. 2, when data streams 331, 341, 351, and 361 transmitted from macro terminals 330, 340, 350, and 360 are aligned using the same phase at the pico base station 320, a pico terminal 310 may transmit two data streams 311 and 312. When the data streams 331, 341, 351, and 361 are not aligned in phase, the pico terminal 310 may transmit only a single data stream.

Accordingly, compared to FIG. 2, a number of transmittable data streams may not increase and thus, a DOF gain may not occur.

As shown in FIG. 3, the pico terminal 310 may determine a substantially optimal transmit beamforming vector and a substantially optimal receive beamforming vector by performing SVD of a channel matrix $H_{11}$ as expressed by Equation 10:

$$H_{11} = U^H D V = \begin{bmatrix} u_1 & u_2 & u_3 \end{bmatrix}^H \begin{bmatrix} \lambda_1 & 0 \\ 0 & \lambda_2 \\ 0 & 0 \end{bmatrix} \begin{bmatrix} v_1 & v_2 \end{bmatrix}, \quad \text{[Equation 10]}$$

where $\lambda_1 \geq \lambda_2$.

The pico terminal 310 may perform transmit beamforming using $V_1$ and $V_2$, and may transmit two data streams 311 and 312 to the pico base station 320. The pico base station 320 may perform receive beamforming using $U_1$ and $U_2$.

When the data streams 331, 341, 351, and 361 transmitted from the macro terminals 330, 340, 350, and 360 are aligned into a direction of $U_3$ substantially orthogonal to $U_1$ and $U_2$, the effect of the data streams 331, 341, 351, and 361 against the pico base station 320 is substantially minimized.

A criterion of aligning the data streams 331, 341, 351, and 361 transmitted from the macro terminals 330, 340, 350, and 360 may be expressed by Equation 11:

$$\underset{\text{Orthogonal direction to the received BF vectors}}{\mathrm{span}(u_3)} = \mathrm{span}[\, H_{12}v_2 \quad H_{13}v_3 \quad H_{14}v_4 \quad H_{15}v_5 \,]. \quad \text{[Equation 11]}$$

Equation 11 may be arranged to Equation 12:

$$u_3 = \alpha_1 H_{12}v_2 = \alpha_2 H_{13}v_3 = \alpha_3 H_{14}v_4 = \alpha_4 H_{15}v_5. \quad \text{[Equation 12]}$$

If $[U_1 \cdot U_2]^H$ is multiplied by Equation 12, it may be expressed as Equation 13:

$$\underbrace{\begin{bmatrix} 0 \\ 0 \end{bmatrix} = [u_1 \ u_2]^H \cdot u_3}_{\text{definition of orthogonal}} =$$

$$\alpha_1 [u_1 \ u_2]^H H_{12} v_2 = \alpha_2 [u_1 \ u_2]^H H_{13} v_3 =$$

$$\alpha_3 [u_1 \ u_2]^H H_{14} v_4 = \alpha_4 [u_1 \ u_2]^H H_{15} v_5$$

$$\Leftrightarrow \tilde{H}_{12} v_2 = \tilde{H}_{13} v_3 = \tilde{H}_{14} v_4 = \tilde{H}_{15} v_5 = 0. \quad \text{[Equation 13]}$$

In Equation 13, $\tilde{H}_{1i} = \alpha_{i-1}[u_1 u_2]^H H_{1i}$. $V_i$ may be determined from vectors present in a null space of $\tilde{H}_{1i}$.

If $V_i$ is not found from the null space of $\tilde{H}_{1i}$, it may not be possible to completely eliminate the effect of interference signals transmitted from the macro terminals 330, 340, 350, and 360 to the pico base station 320. In this case, $V_i$ substantially minimizing the effect of the interference signals may be found.

$V_i$ for minimizing the effect of interference signals transmitted from the macro terminals 330, 340, 350, and 360 to the pico base station 320 may be expressed by Equation 14:

$$\hat{v}_k = \arg\min_{v_k, \|v_k\|=1} \|[u_1 \ u_2]^H H_{1k} v_k\|^2, k = 2, \ldots M_2. \quad \text{[Equation 14]}$$

A result of Equation 14 may be obtained according to Equation 15:

$$\|[u_1 \ u_2]^H H_{1k} v_k\|^2 = ([u_1 \ u_2]^H H_{1k} v_k)^H \quad \text{[Equation 15]}$$

$$([u_1 \ u_2]^H H_{1k} v_k)$$

$$= v_k^H H_{1k}^H \underbrace{[u_1 \ u_2]^H [u_1 \ u_2]}_{I_2: \text{Identity Matrix with size 2}} H_{1k} v_k H_{1k} v_k$$

$$= \frac{v_k^H H_{1k}^H H_{1k} v_k}{v_k^H v_k} \quad (\because v_k^H v_k = 1)$$

$$= \frac{v_k^H R_{1k} v_k}{v_k^H v_k} \quad (\because R_{1k} \triangleq H_{1k}^H H_{1k})$$

$$\therefore \lambda_{min}(R_{1k}) \leq \frac{v_k^H R_{1k} v_k}{v_k^H v_k} \leq \lambda_{max}(R_{1k}).$$

The range of $$\frac{v_k^H R_{1k} v_k}{v_k^H v_k}$$

may be determined according to Equation 16:

$$A \cdot \underset{\substack{\text{eigen} \\ \text{vector}}}{x} = \underset{\substack{\text{eigen} \\ \text{value}}}{\lambda(A)} \cdot \underset{\substack{\text{eigen} \\ \text{vector}}}{x} \quad \text{[Equation 16]}$$

$$\Leftrightarrow x^H(Ax) = x^H(\lambda(A)x)$$

$$\Leftrightarrow x^H A x = \lambda(A) x^H x$$

$$\Leftrightarrow \frac{x^H A x}{x^H x} = \lambda(A)$$

In Equation 16, A corresponds to a symmetrical matrix. In Equation 15, since $R_{1k}$ corresponds to a symmetrical matrix, $$\frac{v_k^H R_{1k} v_k}{v_k^H v_k}$$

may have eigenvalues of $R_{1k}$. Accordingly, a minimum value of $$\frac{v_k^H R_{1k} v_k}{v_k^H v_k}$$

may be a minimum eigenvalue of $R_{1k}$. In this example, $V_k$ may be an eigenvector corresponding to the minimum eigenvalue of $R_{1k}$.

When each of the macro terminals 330, 340, 350, and 360 determines a transmit beamforming vector according to Equation 14, data streams transmitted from the macro terminals 330, 340, 350, and 360 may be set within a predetermined range. A distribution range of the data streams may be reduced by selecting a suitable macro terminal according to an increase in a number of macro terminals, and by enabling only the selected macro terminal to transmit a data stream. When the distribution range of data streams is reduced, an interference alignment may be more accurately performed. Accordingly, if a sufficient number of macro terminals are present, data streams may be aligned without completely cancelling the interference from the macro terminals 330, 340, 350, and 360, and DOF may be calculated according to Equation 17:

$$DOF \sim M_1 + M_2 - 1 \quad \text{[Equation 17]}$$

In Equation 17, $M_1$ corresponds to a number of receive antennas installed in the pico base station 220, and $M_2$ corresponds to a number of receive antennas installed in the macro base station 370.

Accordingly, when a number of receive antennas installed in the macro base station 370 is greater than a number of macro terminals, a data transmission system of FIG. 3 may effectively transmit data.

When the number of macro terminals increases, difficulties may arise in selecting, from the macro terminals, a macro terminal for transmitting data. According to aspects that a gain is high in a signal to noise ratio (SNR) area using a relatively high interference alignment technology and that difficulty arises in accurately aligning interference as a number of macro terminals decreases, it may be possible to select, from the macro terminals, the macro terminal for transmitting data.

According to one example, when a channel has a high SNR or when a number of macro terminals is comparatively small, a relatively small number of candidate terminal groups may be selected from a plurality of macro terminals, and a terminal group maximizing a data transmission capacity of a macro base station may also be selected from the selected candidate terminal groups.

According to another example, when a channel has a low SNR or when a number of macro terminals is comparatively large, a relatively large number of candidate terminal groups may be selected from a plurality of macro terminals.

Figure 4A:
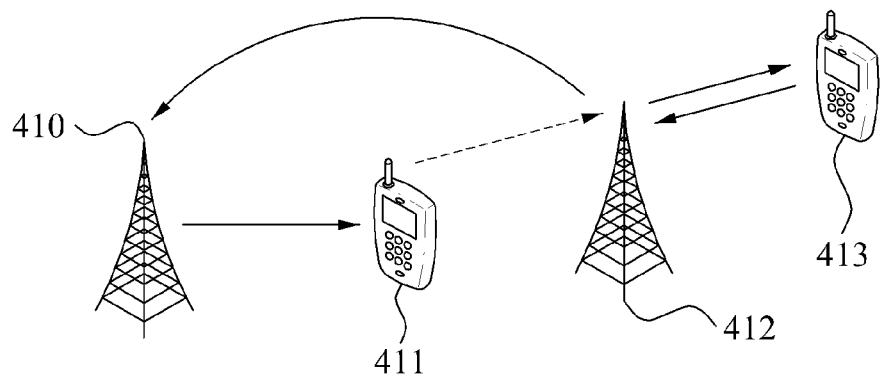
FIGS. 4A through 4C are diagrams illustrating an example of transmitting transmit beamforming vector information.
Figure 4B:
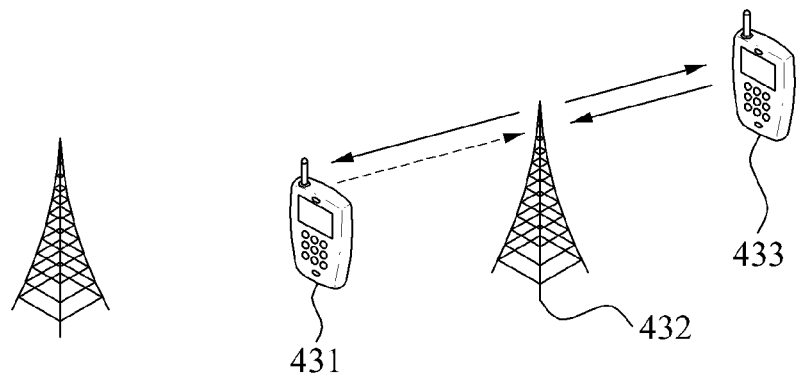
Figure 4C:
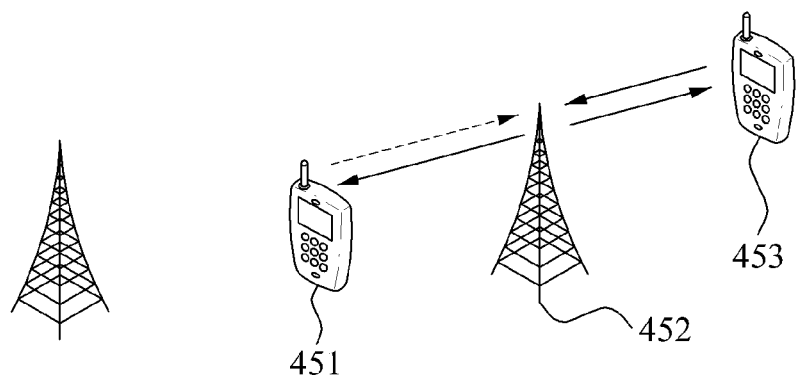

FIGS. 4A through 4C illustrate an example of transmitting transmit beamforming vector information.

FIG. 4A illustrates an example of transmitting transmit beamforming vector information of a macro terminal 411 using a backhaul link between base stations. In FIG. 4A, a pico base station 412 measures a macro channel formed between the macro terminal 411 and the pico base station 412. The pico base station 412 also measures a pico channel formed between a pico terminal 413 and the pico base station 412.

The pico base station 412 may determine a transmit beamforming vector of the macro terminal 411 according to the examples described above with reference to FIG. 2 or FIG. 3. Referring back to FIG. 4A, the pico base station 412 transmits, using the backhaul link, information associated with the transmit beamforming vector of the macro terminal 411 to a macro base station 410. The macro base station 410 transmits, to the macro terminal 411, information associated with the transmit beamforming vector to be used by the macro terminal 411.

FIG. 4B illustrates an example of transmitting transmit beamforming vector information of a macro terminal 431 using an over-the-air (OTA) channel. In FIG. 4B, a pico base station 432 measures a macro channel formed between the macro terminal 431 and the pico base station 432. The pico base station 432 also measures a pico channel formed between a pico terminal 433 and the pico base station 432.

The pico base station 432 may determine a transmit beamforming vector of the macro terminal 431 according to the examples described above with reference to FIG. 2 or FIG. 3. Referring back to FIG. 4B, the pico base station 432 transmits, to the macro terminal 431, information associated with the transmit beamforming vector of the macro terminal 431.

FIG. 4C illustrates an example of transmitting, to a macro terminal 451, information associated with a transmit beamforming vector of the macro terminal 451 in a data transmission system using a time division duplex (TDD) scheme.

In FIG. 4C, a pico base station 452 measures a macro channel formed between the macro terminal 451 and the pico base station 452. The pico base station 452 also measures a pico channel formed between a pico terminal 453 and the pico base station 452.

The pico base station 452 may transmit a reference signal to the macro terminal 451 by employing a receive beamforming vector as a transmit beamforming vector. The macro terminal 451 may determine the transmit beamforming vector so that all the macro terminals may perform nulling of a channel vector using the reference signal.

Figure 5:
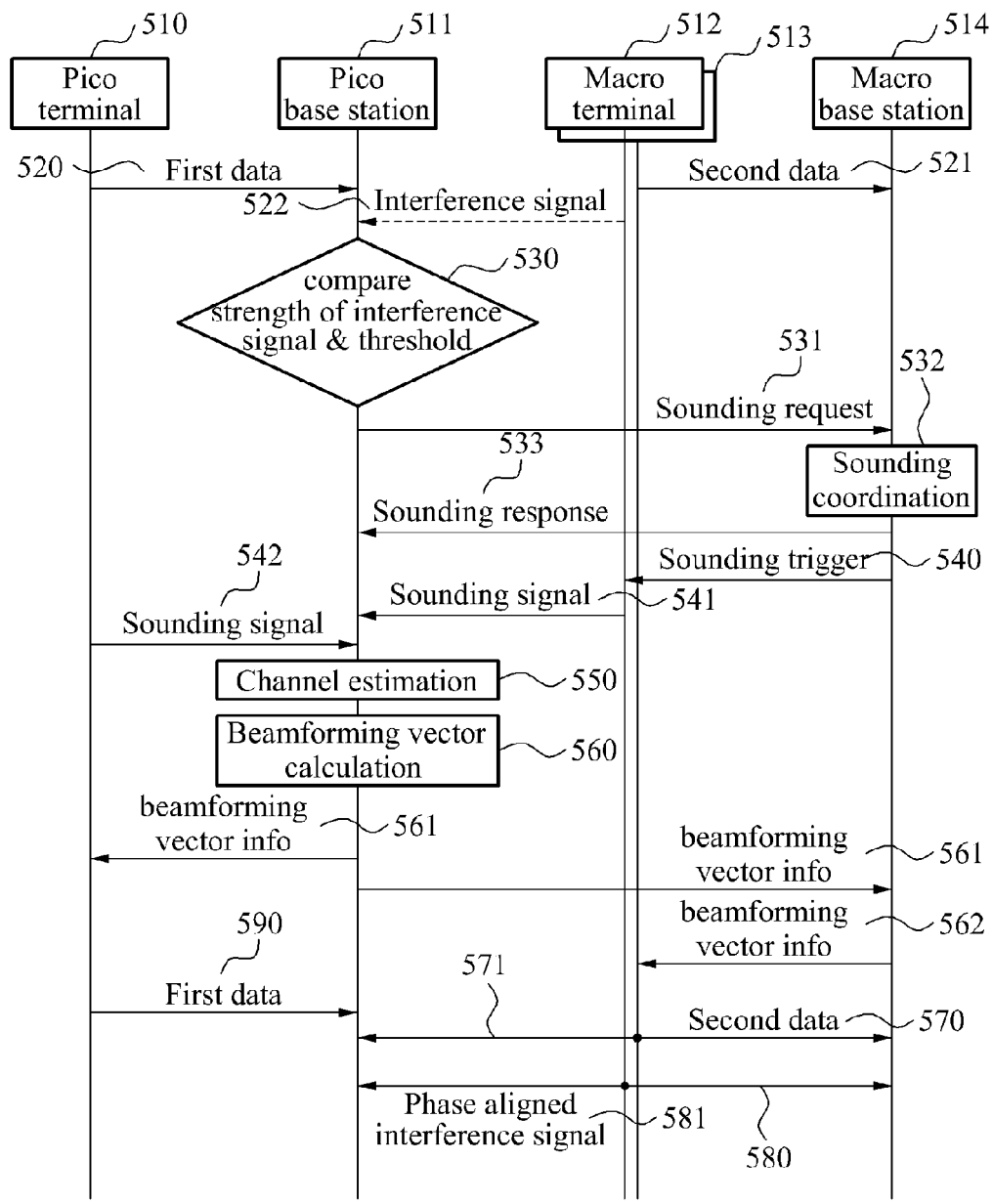
FIG. 5 is a flowchart illustrating an example of a data interference alignment scheme for decreasing interference transmitted to a pico base station.

FIG. 5 illustrates an example of a data interference alignment scheme for decreasing interference transmitted to a pico base station 511. Referring to FIG. 5, the pico base station 511 may transmit a transmit beamforming vector of each of macro terminals 512 and 513, and may also transmit the transmit beamforming vector to each of the macro terminals 512 and 513 via a macro base station 514.

In operation 520, a pico terminal 510 transmits first data to the pico base station 511.

In operation 521, the macro terminals 512 and 513 transmit second data to the macro base station 514.

In operation 522, the second data transmitted from the macro terminals 512 and 513 is received as an interference signal by the pico base station 511.

In operation 530, the pico base station 511 compares a strength of the interference signal received from each of the macro terminals 512 and 513 with a predetermined threshold value. If the strength of the interference signal is greater than the threshold value, the pico base station 511 may transmit a sounding request to the macro base station 514 in operation 531.

In operation 532, the macro base station 514 performs sounding coordination in response to the sounding request.

In operation 533, the pico base station 511 receives a sounding response.

In operation 540, the macro base station 514 transmits a sounding trigger to the macro terminals 512 and 513.

In operation 541, the macro terminals 512 and 513 transmit a sounding signal to the pico base station 511.

In operation 542, the pico terminal 510 transmits a sounding signal to the pico base station 511.

In operation 550, the pico base station 511 estimates a pico channel formed between the pico terminal 510 and the pico base station 511, and a macro channel formed between the pico base station 511 and each of the macro terminals 512 and 513, based on the sounding signal received from the pico terminal 510 and the sounding signal received from each of the macro terminals 512 and 513.

In operation 560, the pico base station 511 generates a transmit beamforming vector of each of the macro terminals 512 and 513, and a transmit beamforming vector of the pico terminal 510. It is described above with reference to FIG. 2 or FIG. 3.

In operation 561, the pico base station 511 transmits, to the pico terminal 510, information associated with the transmit beamforming vector of the pico terminal 510.

In operation 561, the pico base station 511 transmits, to the macro base station 514, information associated with the transmit beamforming vector of each of the macro terminals 512 and 513. The pico base station 511 transmits, to the macro base station 514, information associated with the transmit beamforming vector of the macro terminals 512 and 513 using a backhaul link between the pico base station 511 and the macro base station 514.

In operation 562, the macro base station 514 transmits, to the corresponding macro terminals 512 and 513, information associated with the transmit beamforming vector of each of the macro terminals 512 and 513.

In operation 590, the pico terminal 510 performs transmit beamforming of first data using the transmit beamforming vector of the pico terminal 510.

In operation 570, the macro terminal 513 performs transmit beamforming of second data using the transmit beamforming vector of the macro terminal 513. In 571, the second data transmitted from the macro terminal 513 may be transmitted to the pico base station 511 as an interference signal.

In operation 580, the macro terminal 512 performs transmit beamforming of third data using the transmit beamforming vector of the macro terminal 512. In 581, the third data transmitted from the macro terminal 512 may be transmitted to the pico base station 511 as an interference signal.

In operations 571 and 581, the interference signals transmitted from the macro terminals 512 and 513 are received using the same phase at the pico base station 511. In addition, the phase of the interference signals may be orthogonal to a received phase of the first data transmitted from the pico terminal 510.

Figure 6:
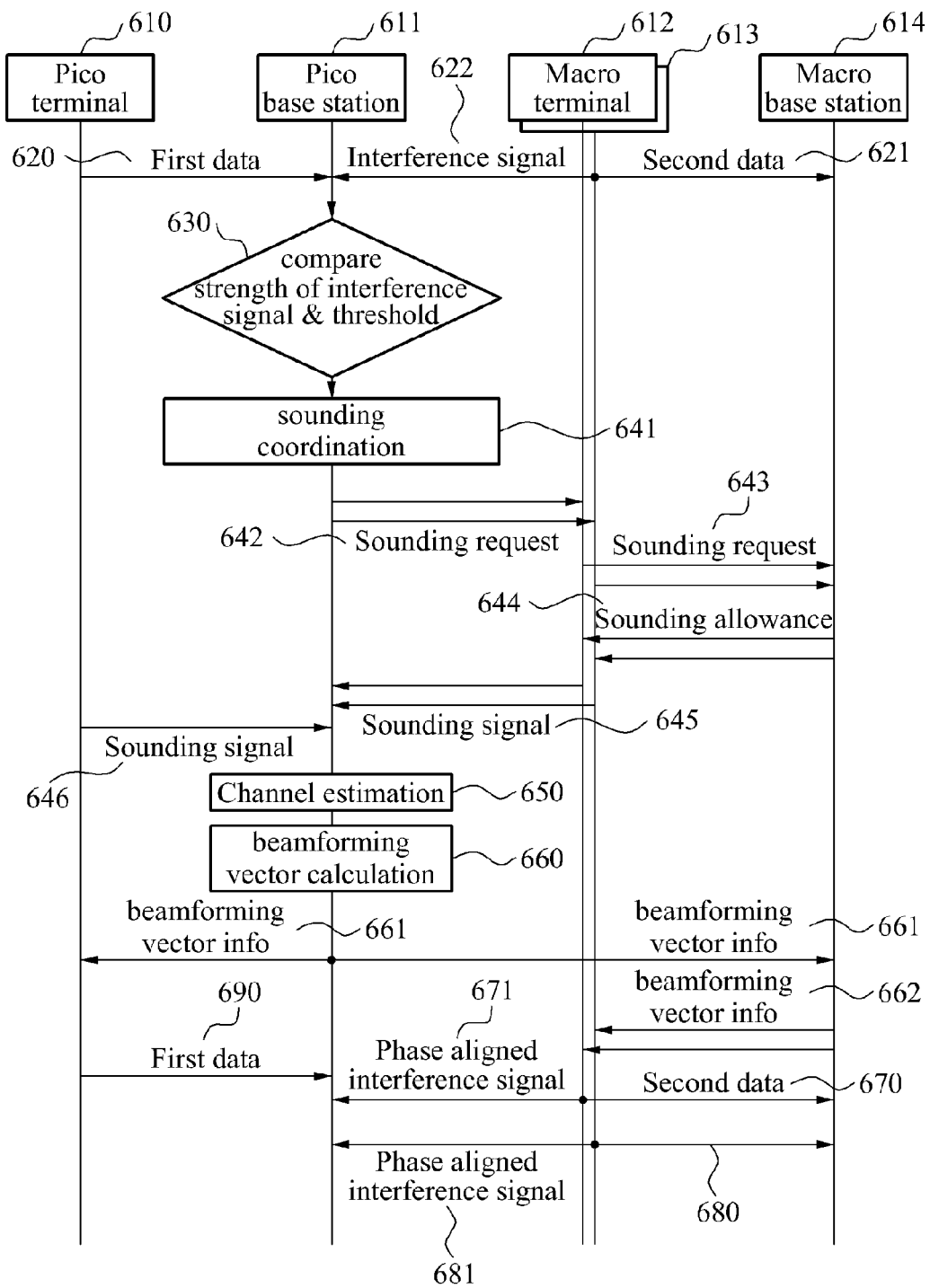
FIG. 6 is a flowchart illustrating another example of a data interference alignment scheme decreasing interference transmitted to a pico base station.

FIG. 6 illustrates another example of a data interference alignment scheme decreasing interference transmitted to a pico base station 611.

Operations 620 through 630 are similar to operations 520 through 530 of FIG. 5 and thus, further detailed description will be omitted here.

If a strength of an interference signal is greater than a predetermined threshold value, the pico base station 611 may perform sounding coordination in operation 641.

In operation 642, the pico base station 611 transmits a sounding request to macro terminals 612 and 613. In operation 643, the macro terminals 612 and 613 transmit a sounding request to a macro base station 614.

In operation 644, the macro base station 614 transmits a sounding allowance message to the macro terminals 612 and 613 in response to the sounding request.

In operation 645, the macro terminals 612 and 613 transmit a sounding signal to the pico base station 611.

In operation 646, a pico terminal 610 transmits a sounding signal to the pico base station 611.

Operations 650 through 690 are similar to 550 through 590 of FIG. 5 and thus, further detailed description will be omitted here.

Figure 7:
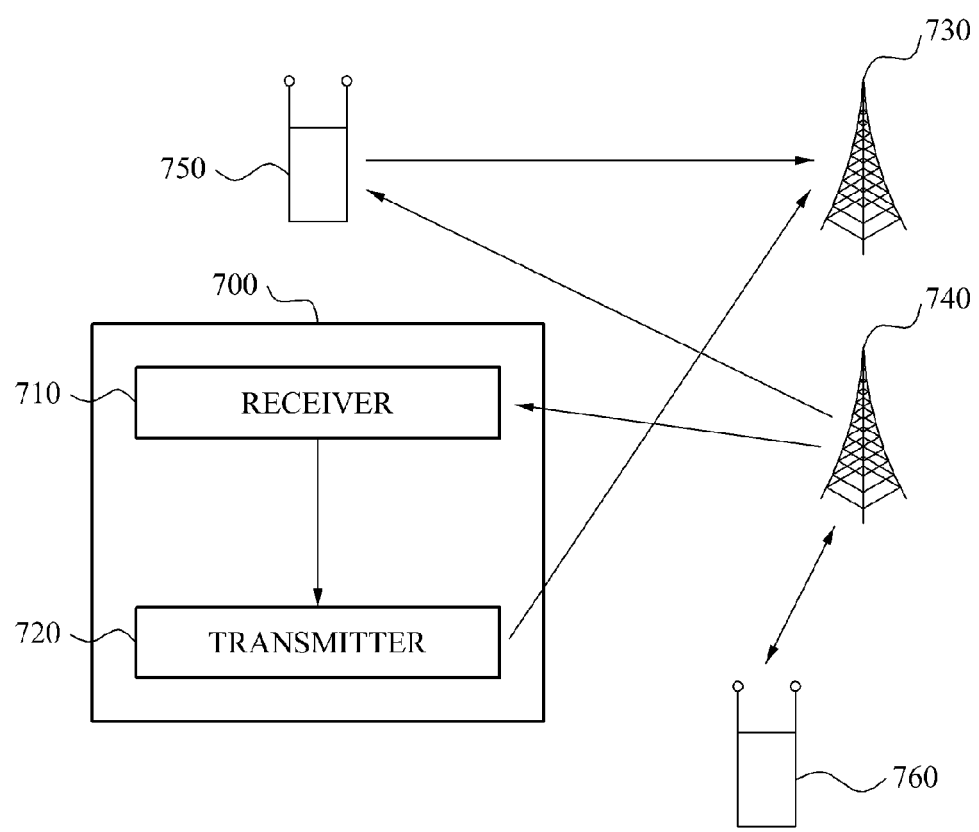
FIG. 7 is a diagram illustrating an example of a macro terminal.

FIG. 7 illustrates an example of a macro terminal 700.

Referring to FIG. 7, the macro terminal 700 includes a receiver 710 and a transmitter 720.

A pico base station 740 may receive a transmit beamformed first data stream from a pico terminal 760. The macro terminal 700 may perform transmit beamforming of a second data stream and transmit the transmit beamformed second data stream to a macro base station 730. A second macro terminal 750 may perform transmit beamforming of a third data stream and transmit the transmit beamformed third data stream to the macro base station 730. As described above with reference to FIG. 1, it can be assumed that the macro terminal 700 and a second macro terminal 750 transmit a significant interference signal to the pico base station 740, however, the pico terminal 760 can be assumed to not transmit an interference signal to the macro base station 730 or to transmit only a weak interference signal.

The pico base station 740 may generate a transmit beamforming vector of the macro terminal 700. As described above in the examples illustrated in FIG. 2 and FIG. 3, the pico base station 740 may generate the transmit beamforming vector of the macro terminal 700 based on a channel formed between the macro terminal 700 and the pico base station 740, and a channel formed between the pico base station 740 and the pico terminal 760.

The receiver 710 may receive, from the pico base station 740, information associated with the transmit beamforming vector of the macro terminal 700.

The transmitter 720 may identify the transmit beamforming vector based on information associated with the transmit beamforming vector, and may perform transmit beamforming of the second data stream using the identified transmit beamforming vector. The transmitter 720 may transmit the transmit beamformed second data stream to the macro base station 730.

The second macro terminal 750 may receive, from the pico base station 740, information associated with the transmit beamforming vector of the second macro terminal 750. The second macro terminal 750 may perform transmit beamforming of the third data stream using the transmit beamforming vector of the second macro terminal 750.

The second data stream and the third data stream may be transmitted to the pico base station 740 in addition to the macro base station 730. Accordingly, the second data stream and the third data stream may act as interference signals at the pico base station 740.

In the above example, the pico base station 740 may determine the transmit beamforming vector of each of the macro terminal 700 and the second macro terminal 750 so that the second data stream and the third data stream may be received using the same phase at the pico base station 740.

In addition, the pico base station 740 may determine the transmit beamforming vector of each of the macro terminal 700 and the pico terminal 760 so that a phase of the first data stream received by the pico base station 740 may be substantially orthogonal to a phase of the second data stream received by the pico base station 740.

Figure 8:
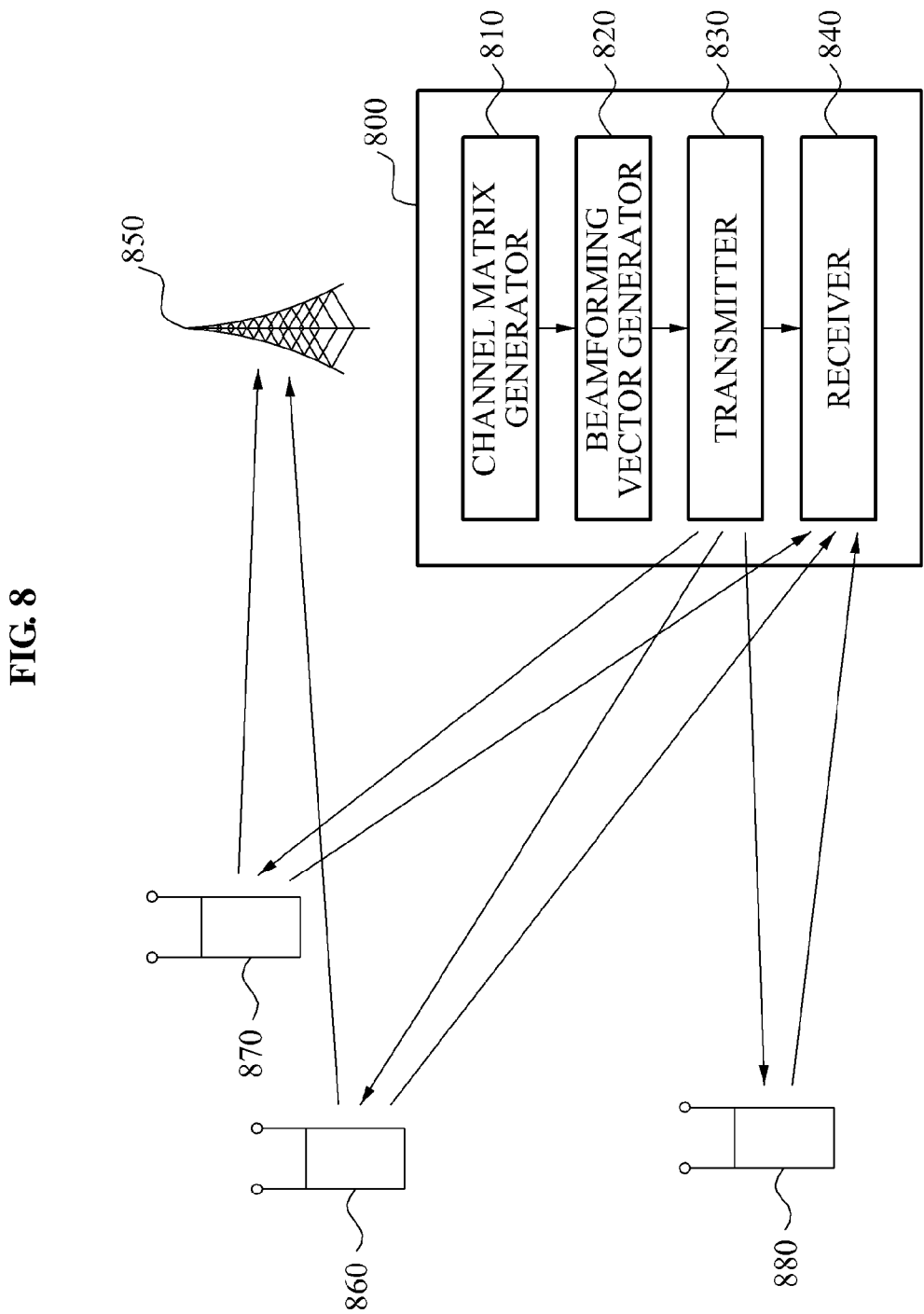
FIG. 8 is a diagram illustrating an example of a pico base station.

FIG. 8 illustrates an example of a pico base station 800.

Referring to FIG. 8, the pico base station 800 includes a transmitter 830 and a receiver 840, and may also include a channel matrix generator 810 and a beamforming vector generator 820.

The channel matrix generator 810 generates a channel matrix by estimating a state of a channel formed between the pico base station 800 and a pico terminal 880.

The beamforming vector generator 820 generates a transmit beamforming vector of the pico terminal 880 based on the channel matrix formed between the pico base station 800 and the pico terminal 880. Further, the beamforming vector generator 820 may generate a transmit beamforming vector of each of a first macro terminal 860 and a second macro terminal 870 based on the channel matrix between the pico base station 800 and the pico terminal 880.

The transmitter 830 transmits, to the pico terminal 880, information associated with a to transmit beamforming vector of the pico terminal 880. Further, the transmitter 830 may transmit, to the first macro terminal 860, information associated with the transmit beamforming vector of the first macro terminal 860, and may transmit, to the second macro terminal 870, information associated with the transmit beamforming vector of the second macro terminal 870.

The pico terminal 880 identifies the transmit beamforming vector of the pico terminal 880 based on information associated with the transmit beamforming vector of the pico terminal 880, and performs transmit beamforming of a first data stream using the identified transmit beamforming vector.

The receiver 840 receives the transmit beamformed first data stream. As one example, the beamforming vector generator 820 may generate a receive beamforming vector based on the channel matrix. Examples of generating the receive beamforming vector are described above with reference to FIG. 2 and FIG. 3 and thus, further detailed description will be omitted here. The receiver 840 may perform receive beamforming of the first data stream using the receive beamforming vector.

The first macro terminal 860 may receive information associated with the transmit beamforming vector of the first macro terminal 860. The second macro terminal 870 may receive information associated with the transmit beamforming vector of the second macro terminal 870. The first macro terminal 860 may perform transmit beamforming of a second data stream using the transmit beamforming vector of the first macro terminal 860, and may transmit the transmit beam formed second data stream to a macro base station 850. Similarly, the second macro terminal 870 may perform transmit beamforming of a third data stream and transmit the transmit beam formed third data stream to the macro base station 850.

The second data stream and the third data stream may also be transmitted to the pico base station 800. Accordingly, the second data stream and the third data stream may act as interference signals at the pico base station 800.

The beamforming vector generator 820 may generate the transmit beamforming vector of the first macro terminal 860 and the transmit beamforming vector of the second macro terminal 870, so that a phase of the second data stream received at the pico base station 800 may be the same as a phase of the third data stream received at the pico base station 800. Accordingly, the receiver 840 may receive the transmit beam formed third data stream using the same phase as the transmit beam formed second data stream.

The beamforming vector generator 820 may generate the transmit beamforming vector of the first macro terminal 860 so that the first data stream received by the receiver 840 may be substantially orthogonal to the second data stream received by the receiver 840. A corresponding example of generating the transmit beamforming vector is described above with reference to FIG. 2 and thus, further detailed description will be omitted here.

The beamforming vector generator 820 may generate the transmit beamforming vector of the first macro terminal 860 and the transmit beamforming vector of the second macro terminal 870, so that a phase difference between the second data stream and the third data stream received by the receiver 840 may be minimized. A corresponding example of generating the transmit beamforming vector is described above with reference to FIG. 3 and thus, further detailed description will be omitted here.

Figure 9:
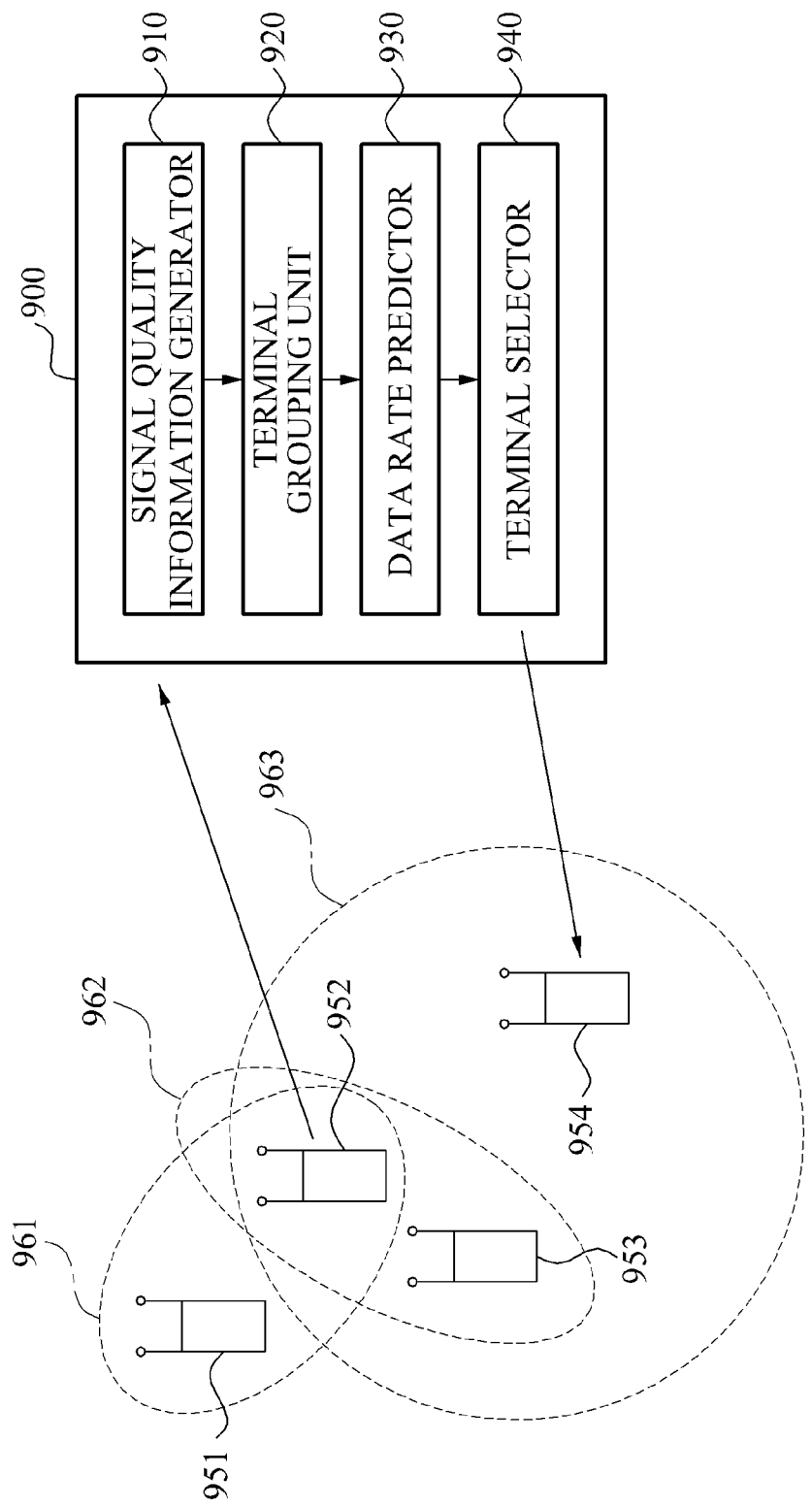
FIG. 9 is a diagram illustrating an example of a macro base station.

FIG. 9 illustrates an example of a macro base station 900.

Referring to FIG. 9, the macro base station 900 may include a signal quality information generator 910, a terminal grouping unit 920, a data rate predictor 930, and a terminal selector 940.

The signal quality information generator 910 generates signal quality information associated with channel(s) formed between the macro base station 900 and macro terminal(s), such as illustrated macro terminals 951, 952, 953, and 954. The signal quality information may be an SNR or a signal to interference and noise ratio (SINR).

The terminal grouping unit 920 groups macro terminals into terminal groups. As illustrated in FIG. 9, the terminal grouping unit 920 may group the plurality of macro terminals 951, 952, 953, and 954 into a plurality of terminal groups 961, 962, and 963. The terminal grouping unit 920 may group macro terminals based on the signal quality information.

The terminal grouping unit 920 compares signal quality information of each macro terminal with a predetermined threshold value, and may group the plurality of macro terminals 951, 952, 953, and 954 based on a comparison result.

The macro base station 900 may select a single terminal group from the terminal groups 961, 962, and 963, and receive data from terminals included in the selected terminal group.

If the macro base station 900 receives data using an interference alignment scheme and an SNR of a corresponding terminal is relatively high, a gain of the interference alignment scheme may increase. Further, if the macro base station 900 receives data using an interference alignment scheme and a number of macro terminals is relatively small, a gain of the interference alignment scheme may increase.

Accordingly, if the number of macro terminals is relatively small, the terminal grouping unit 920 may set a terminal group from among macro terminals having a relatively high signal quality. For example, if a number of macro terminals is greater than a predetermined threshold value, the terminal grouping unit 920 may set a signal quality threshold value to be a value less than a predetermined reference value, and may determine a terminal group from terminals having a signal quality information value greater than the signal quality threshold value.

If a number of macro terminals is relatively large, the terminal grouping unit 920 may set the terminal group from among macro terminals having a relatively high signal strength. For example, if a number of macro terminals is less than a predetermined threshold value, the terminal grouping unit 920 may set the signal quality threshold value to be a value greater than the predetermined reference value and may determine a terminal group from terminals having the signal quality information value greater than the signal quality threshold value. In this example, a majority of the macro terminals may be included in the terminal group.

The data rate predictor 930 predicts a data rate of each terminal group by scheduling each terminal group.

To improve performance, a data rate prediction including a beamforming vector calculation may be performed with respect to all probable combinations of macro terminals. However, this example of data rate prediction may use a significant number of calculations. Accordingly, the data rate predictor 930 may constitute a plurality of terminal groups with respect to macro terminals having a relatively high signal quality information, and may select, from the plurality of terminals groups, a terminal group for transmitting data.

The data rate predictor 930 may predict a data rate with respect to each macro terminal by virtually applying an interference alignment scheme to macro terminals included in each terminal group, and may predict a data rate with respect to each terminal group by adding up data rates of macro terminals included in a corresponding terminal group.

The terminal selector 940 selects a terminal group for receiving data from the macro base station 900. As illustrated in FIG. 9, the terminal selector 940 may select, from the plurality of terminal groups 961, 962, and 963, a terminal group for receiving data from the macro base station 900 based on the data rate with respect to the terminal groups 961, 962, and 963.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A pico base station, comprising:
a channel matrix generator configured to generate a first channel matrix by estimating a channel between the pico base station and a pico terminal;
a beamforming vector generator configured to generate a transmit beamforming vector of the pico terminal and a transmit beamforming vector of a macro terminal distinct from the pico terminal, based on the first channel matrix between the pico base station and the pico terminal, the transmit beamforming vector of the pico terminal to be applied by the pico terminal to a data stream to transmit-beamform the data stream, and the transmit beamforming vector of the macro terminal to be applied by the macro terminal to a signal to transmit-beamform the signal;
a transmitter configured to transmit, to the pico terminal, the generated transmit beamforming vector of the pico terminal, and transmit, to the macro terminal, the generated transmit beamforming vector of the macro terminal; and
a receiver configured to receive, from the pico terminal, the data stream that is transmit-beamformed by the pico terminal according to the transmitted transmit beamforming vector of the pico terminal.

2. The pico base station of claim 1, wherein:
the beamforming vector generator is further configured to generate a transmit beamforming vector of another macro terminal distinct from the pica and macro terminals, based on the first channel matrix between the pica base station and the pico terminal, the transmit beamforming vector of the other macro terminal to be applied by the other macro terminal to another signal to transmit-beamform the other signal;

the transmitter is further configured to transmit, to the other macro terminal, the generated transmit beamforming vector of the other macro terminal; and the signal transmitted from the macro terminal comprises substantially a same phase as the other signal transmitted from the other macro terminal.

3. The pico base station of claim 2, wherein:

the beamforming vector generator is further configured to generate a receive beamforming vector based on the first channel matrix between the pico base station and the pico terminal; and the receiver is further configured to apply the receive beamforming vector to the data stream received from the pico terminal, to receive-beamform the received data stream.

4. The pico base station of claim 3, wherein the beamforming vector generator is configured to generate the transmit beamforming vector of the macro terminal such that the receive-beamformed data stream is substantially orthogonal to the signal transmitted from the macro terminal.

5. The pico base station of claim 3, wherein:

the channel matrix generator is further configured to generate a second channel matrix by estimating a channel between the pico base station and the macro terminal; and the beamforming vector generator is configured to calculate the transmit beamforming vector of the macro terminal according to Equation 1 or Equation 2, $$v = \mu \cdot \begin{bmatrix} -(\tilde{h}^{(2)})^H \\ (\tilde{h}^{(1)})^H \end{bmatrix}$$ [Equation 1]

$$v = \mu \cdot \begin{bmatrix} (\tilde{h}^{(2)})^H \\ -(\tilde{h}^{(1)})^H \end{bmatrix},$$ [Equation 2]

wherein v corresponds to the transmit beamforming vector of the macro terminal, µ corresponds to a predetermined constant, and $\tilde{h}^{(1)}$ and $\tilde{h}^{(2)}$ are determined according to Equation 3

$$\tilde{h} = \alpha \cdot u^H \cdot H = \begin{bmatrix} \tilde{h}^{(1)} \\ \tilde{h}^{(2)} \end{bmatrix},$$ [Equation 3]

wherein $u_1$ corresponds to the receive beamforming vector of the pico base station, H corresponds to the second channel matrix, and α corresponds to a predetermined constant.

6. The pico base station of claim 3, wherein:

the other macro terminal is configured to transmit-beamform the other signal according to the transmitted transmit beamforming vector of the other macro terminal, and transmit the transmit-beamformed other signal to a macro base station; and the beamforming vector generator is configured to generate the transmit beamforming vector of each of the macro terminal and the other macro terminal by calculating a vector that minimizes a phase difference between the signal transmitted from the macro terminal and the other signal transmitted from the other terminal.

7. The pico base station of claim 3, wherein:

the channel matrix generator is further configured to generate a second channel matrix by estimating a channel between the pico base station and the macro terminal; and the beamforming vector generator is further configured to generate an autocorrelation matrix according to Equation 4, and calculate an eigenvector corresponding to a minimum eigenvalue of the autocorrelation matrix as the transmit beamforming vector of the macro terminal, $$R = H^H \cdot H$$ [Equation 4]

wherein R corresponds to the autocorrelation matrix, and H corresponds to the second channel matrix.

8. The pico base station of claim 3, further comprising:

a singular value decomposition (SVD) performing unit configured to perform SVD of the channel matrix.

9. The pico base station of claim 1, wherein the transmit beamforming vector of the macro terminal is transmitted to the macro terminal through a macro base station.

10. The pico base station of claim 1, wherein:

the transmitter is further configured to transmit a sounding request to a macro base station in response to a strength of the signal transmitted from the macro terminal being greater than a predetermined threshold value; and the receiver is further configured to receive a sounding response from the macro base station in response to the sounding request.

11. The pico base station of claim 10, wherein:

the macro base station is configured to transmit a sounding trigger to the macro terminal in response to the sounding request;

the receiver is further configured to receive a first sounding signal from the macro terminal in response to the sounding trigger, and receive a second sounding signal from the pico terminal; and the channel matrix generator is configured to generate the first channel matrix and a second channel matrix between the pico base station and the macro terminal based on the first and second sounding signals.

12. The pico base station of claim 1, wherein:

the transmitter is further configured to transmit a first sounding request to the macro terminal in response to a strength of the signal transmitted from the macro terminal being greater than a predetermined threshold value; and the macro terminal is configured to transmit a second sounding request to a macro base station in response to the first sounding request.

13. The pico base station of claim 12, wherein:

the macro base station is configured to transmit a sounding allowance to the macro terminal in response to the second sounding request;

the receiver is further configured to receive a first sounding signal from the macro terminal in response to the sounding allowance, and receive a second sounding signal from the pico terminal; and the channel matrix generator is configured to generate the first channel matrix and a second channel matrix between the pico base station and the macro terminal based on the first and second sounding signals.

14. The pico base station of claim 1, wherein the receiver is further configured to receive, from the macro terminal, the signal that is transmit-beamformed by the macro terminal according to the transmitted transmit beamforming vector of the macro terminal, the signal being substantially orthogonal to the data stream that is transmit-beamformed by the pico terminal according to the transmitted transmit beamforming vector of the pico terminal.

15. A macro base station, comprising:
a signal quality information generator configured to generate signal quality information of each of channels formed between the macro base station and each of macro terminals;
a threshold value setting unit configured to set a signal quality threshold value to be greater than a predetermined reference value in response to a number of the macro terminals being less than a predetermined threshold value,
a terminal grouping unit configured to determine terminal groups from the macro terminals, based on the signal quality information, one of the terminal groups comprising the macro terminals that each comprise a value of the signal quality information that is greater than the signal quality threshold value;
a data rate predictor configured to predict a data rate of each of the terminal groups by scheduling each of the terminals groups; and
a terminal selector configured to select, from the terminal groups, a terminal group to receive data from the macro base station, based on the predicted data rate.

16. The macro base station of claim 15, wherein the signal quality information comprises a signal to noise ratio (SNR) or a signal to interference and noise ratio (SINR).

17. The macro base station of claim 15, wherein the threshold value setting unit is further configured to set the signal quality threshold value to be less than the predetermined reference value in response to the number of the macro terminals being greater than or equal to the predetermined threshold value.

18. A method of transmitting and receiving at a macro terminal, the method comprising:
receiving, by a receiver of the macro terminal, a transmit beamforming vector from a pico base station, the pico base station receiving a transmit-beamformed first data stream from a pico terminal distinct from the macro terminal, and the transmit beamforming vector to be applied by the macro terminal to a second data stream to transmit-beamform the second data stream;
transmit-beamforming, by a transmitter of the macro terminal, the second data stream according to the received transmit beamforming vector; and
transmitting, by the transmitter, the transmit-beamformed second data stream to a macro base station,
wherein the transmit beamforming vector is calculated based on a channel matrix of a channel formed between the pico terminal and the pico base station.

19. The method of claim 18, wherein:
another macro terminal distinct from the pico and macro terminals
receives another transmit beamforming vector from the pico base station, the other transmit beamforming vector to be applied by the other macro terminal to a third data stream to transmit-beamform the third data stream,
transmit-beamforms the third data stream according to the received other transmit beamforming vector, and
transmit the transmit-beamformed third data stream to the macro base station; and
the transmit-beamformed second data stream and the transmit-beamformed third data stream are received by the pico base station with substantially a same phase.

20. The method of claim 19, wherein the pico base station generates the transmit beamforming vector and the other transmit beamforming vector that substantially minimize a phase difference between the transmit-beamformed third data stream and the transmit-beamformed second data stream.

21. The method of claim 18, wherein a phase of the first data stream received by the pico base station is substantially orthogonal to a phase of the second data stream received by the pico base station.

* * * * *